United States Patent
Li et al.

(10) Patent No.: US 9,161,359 B2
(45) Date of Patent: Oct. 13, 2015

(54) METHOD FOR ACTIVATING OR DEACTIVATING EXTENDED CARRIER, AND BASE STATION

(71) Applicant: Huawei Technologies Co., Ltd., Shenzhen, Guangdong (CN)

(72) Inventors: Yajuan Li, Beijing (CN); Xingwei Zhang, Beijing (CN); Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/059,097

(22) Filed: Oct. 21, 2013

(65) Prior Publication Data

US 2014/0050169 A1    Feb. 20, 2014

Related U.S. Application Data

(63) Continuation of application No. PCT/CN2012/072704, filed on Mar. 21, 2012.

(30) Foreign Application Priority Data

Apr. 20, 2011    (CN) .......................... 2011 1 0099391

(51) Int. Cl.
*H04W 72/04* (2009.01)
*H04L 5/00* (2006.01)

(52) U.S. Cl.
CPC ......... *H04W 72/0453* (2013.01); *H04L 5/0098* (2013.01); *H04W 72/04* (2013.01); *H04L 5/001* (2013.01); *H04L 5/0053* (2013.01)

(58) Field of Classification Search
CPC . H04W 72/0453; H04L 5/001; H04L 5/0053; H04L 5/0098
See application file for complete search history.

(56) References Cited

U.S. PATENT DOCUMENTS

2010/0130219 A1* 5/2010 Cave et al. .................... 455/450
2011/0080885 A1* 4/2011 Shin et al. ..................... 370/329

FOREIGN PATENT DOCUMENTS

| CN | 101998523 A | 3/2011 |
| CN | 102014480 A | 4/2011 |
| EP | 2360866 A1 | 8/2011 |
| WO | WO 2010051209 A1 | 5/2010 |
| WO | WO 2011013964 A2 | 2/2011 |
| WO | WO 2011053055 A2 | 5/2011 |

OTHER PUBLICATIONS

"DL carrier activation/deactivation by MAC," Document R2-101119, 3GPP TSG RAN WG2 #69, San Francisco, California, 3rd Generation Partnership Project, Valbonne, France (Feb. 22-26, 2010).

* cited by examiner

*Primary Examiner* — Jianye Wu
(74) *Attorney, Agent, or Firm* — Leydig, Voit & Mayer, Ltd.

(57) ABSTRACT

A method for activating or deactivating an extended carrier and a base station are disclosed, and relate to the field of radio communications. The method includes: configuring an extended carrier of an independent carrier for a user equipment, where the extended carrier includes at least one of an adjacent extended carrier of the independent carrier and a non-adjacent extended carrier of the independent carrier; and activating or deactivating the extended carrier by using a bit in an original MAC CE and/or an extended MAC CE and corresponding to an index of the extended carrier. The base station includes a configuring module and an activating or deactivating module.

12 Claims, 4 Drawing Sheets

```
┌─────────────────────────────────────────────────────────┐
│ A base station configures an extended carrier of an    │  ／ 101
│ independent carrier for a user equipment, where the    │
│ extended carrier includes at least one of a            │
│ neighboring extended carrier of the independent        │
│ carrier and a non-neighboring extended carrier of the  │
│ independent carrier                                    │
└─────────────────────────────────────────────────────────┘
                          │
                          ▼
┌─────────────────────────────────────────────────────────┐
│ The base station activates or deactivates the extended │  ／ 102
│ carrier by using a bit in an original MAC CE and/or an │
│ extended MAC CE and corresponding to an index of the   │
│ extended carrier                                       │
└─────────────────────────────────────────────────────────┘
```

|  | 7 | 6 | 5 | 4 | 3 | 2 | 1 | 0 |
|---|---|---|---|---|---|---|---|---|
| Original MAC CE | 0 | 1 | 0 | 1 | 1 | 1 | 1 | 1 |
| Extended MAC CE of a neighboring extended carrier | 0 | 0 | 0 | 0 | 0 | 0 | 0 | 1 |

Whether there is an instruction to activate the neighboring extended carrier

FIG. 5

|  | 7 | 6 | 5 | 4 | 3 | 2 | 1 | 0 |
|---|---|---|---|---|---|---|---|---|
| Original MAC CE | 0 | 1 | 0 | 1 | 1 | 1 | 1 | 1 |
| First extended MAC CE | 0 | 0 | 0 | 0 | 0 | 0 | 0 | 1 |
| Second extended MAC CE | 0 | 0 | 0 | 0 | 0 | 1 | 0 | 0 |

Whether there is an instruction to activate a neighboring extended carrier

FIG. 6

|  | 7 | 6 | 5 | 4 | 3 | 2 | 1 | 0 |
|---|---|---|---|---|---|---|---|---|
| Original MAC CE | 0 | 0 | 0 | 1 | 1 | 1 | 1 | 1 |
| Extended MAC CE1 | 0 | 0 | 0 | 0 | 0 | 0 | 0 | 1 |
| Extended MAC CE2 | 0 | 0 | 0 | 0 | 0 | 1 | 1 | 0 |

Whether there is an instruction to activate an extended carrier

FIG. 7

|  | 7 | 6 | 5 | 4 | 3 | 2 | 1 | 0 |
|---|---|---|---|---|---|---|---|---|
| Original MAC CE | 0 | 1 | 0 | 1 | 1 | 1 | 1 | 1 |
| Extended MAC CE1 | 0 | 0 | 0 | 0 | 0 | 0 | 0 | 1 |
| Extended MAC CE2 | 0 | 0 | 0 | 0 | 0 | 0 | 1 | 0 |

← Whether there is an instruction to activate a neighboring extended carrier

FIG. 8

|  | 7 | 6 | 5 | 4 | 3 | 2 | 1 | 0 |
|---|---|---|---|---|---|---|---|---|
| Original MAC CE | 0 | 1 | 0 | 1 | 1 | 1 | 1 | 1 |
| Extended MAC CE | 0 | 0 | 0 | 0 | 0 | 0 | 0 | 1 |

← Whether there is an instruction to activate an extended carrier

METHOD FOR ACTIVATING OR DEACTIVATING EXTENDED CARRIER, AND BASE STATION

CROSS-REFERENCE TO RELATED APPLICATION

This application is a continuation of International Patent Application No. PCT/CN2012/072704, filed on Mar. 21, 2012, which claims priority to Chinese Patent Application No. 201110099391.3, filed on Apr. 20, 2011, both of which are hereby incorporated by reference in their entireties.

TECHNICAL FIELD

Embodiments of the present invention relate to the field of radio communications, and in particular, to a method for determining a timing advance, a terminal device, and a network side device.

BACKGROUND

Figure 1:
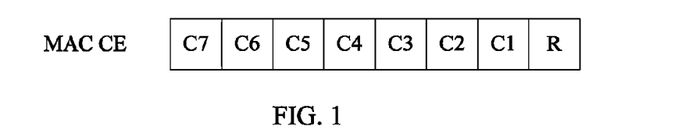
FIG. 1 is a schematic diagram of a format of an MAC CE in the prior art.

In LTE (Long Term Evolution, long term evolution) R10, an independent carrier is activated by using the following two steps: configuration and activation. That is, an eNode B (evolved Node B, evolved base station) firstly configures carriers for a UE (User Equipment) by using RRC (Radio Resource Control, radio resource control) signaling, and then activates all or part of carriers by using an MAC CE (Media Access Control Control Element, media access control control element). The UE can receive or transmit data on the activated carriers. FIG. 1 illustrates a format of an MAC CE used to activate or deactivate a carrier, where Ci refers to activation or deactivation of a secondary carrier with an index i. If Ci is set to "1", it indicates activation; and if Ci is set to "0", it indicates deactivation. R refers to a reserved bit (bit) and is set to "0".

It can be seen from the above that, currently, LTE R10 only provides a solution for activating or deactivating an independent carrier. However, besides independent carriers, there are also extended carriers. An extended carrier cannot exist independently but is attached to an independent carrier, and an extended carrier does not carry a synchronization signal, a system message, a paging (paging) message, or the like. The prior art does not provide a corresponding solution for how to activate or deactivate an extended carrier.

SUMMARY

To solve the problem of activating or deactivating an extended carrier, embodiments of the present invention provide a method for activating or deactivating an extended carrier and a base station. The technical solution is as follows:

A method for activating or deactivating an extended carrier includes:

configuring an extended carrier of an independent carrier for a user equipment, where the extended carrier includes at least one of an adjacent extended carrier of the independent carrier and a non-adjacent extended carrier of the independent carrier; and activating or deactivating the extended carrier by using a bit in an original media access control control element MAC CE and/or an extended MAC CE and corresponding to an index of the extended carrier.

A base station includes:

a configuring module, adapted to configure an extended carrier of an independent carrier for a user equipment, where the extended carrier includes at least one of an adjacent extended carrier of the independent carrier and a non-adjacent extended carrier of the independent carrier; and an activating or deactivating module, adapted to activate or deactivate the extended carrier by using a bit in an original media access control control element MAC CE and/or an extended MAC CE and corresponding to an index of the extended carrier.

The technical solution provided in the embodiments of the present invention provides the following beneficial effect:

By configuring an extended carrier for a user equipment, and activating or deactivating the extended carrier by using a bit in an original MAC CE and/or an extended MAC CE and corresponding to an index of the extended carrier, a solution for activating or deactivating an extended carrier is provided.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

An extended carrier cannot exist independently but is attached to an independent carrier, and an extended carrier does not carry a synchronization signal, a system message, a paging (paging) message, or the like. An independent carrier is a common carrier and carries a synchronization signal, a system message, a paging message, or the like.

Figure 2:
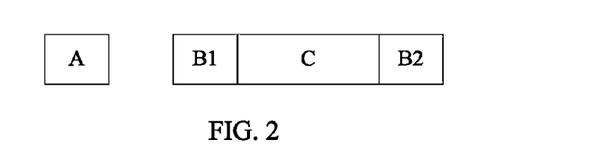
FIG. 2 is a schematic diagram of an extended carrier according to the present invention.

There are two types of extended carriers: a first type is extended carrier adjacent to an independent carrier, which is referred to as adjacent extended carrier; and a second type is extended carrier not adjacent to any one independent carrier, which is referred to as non-adjacent extended carrier. For example, referring to FIG. 2, C is an independent carrier, B1, B2 and A are extended carriers, and B1 and B2 are adjacent to C. Therefore, B1 and B2 are adjacent extended carriers of C; and because A is not adjacent to C or any other independent carrier, A is a non-adjacent extended carrier.

Embodiment 1

Figure 3:
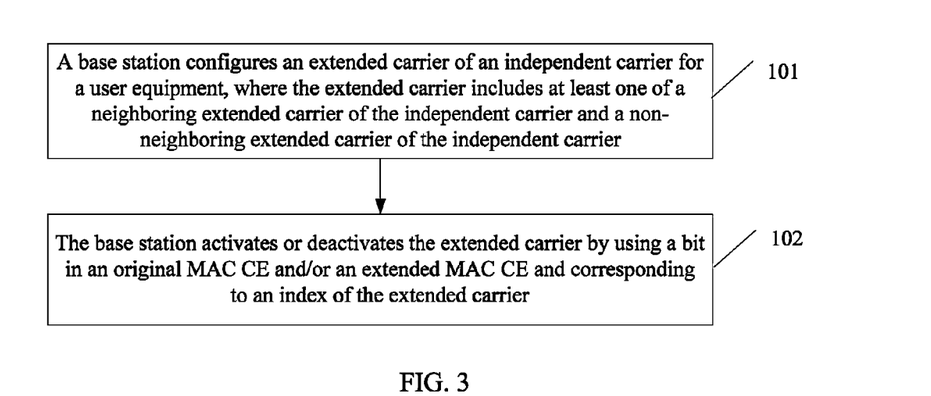
FIG. 3 is a flowchart of a method for activating or deactivating an extended carrier according to Embodiment 1 of the present invention.

Referring to FIG. 3, this embodiment provides a method for activating or deactivating an extended carrier includes the following steps:

101. A base station configures an extended carrier of an independent carrier for a user equipment, where the extended carrier includes at least one of an adjacent extended carrier of the independent carrier and a non-adjacent extended carrier of the independent carrier.

Step 101 specifically includes:

sending, by the base station, carrier configuration information to the user equipment, where the carrier configuration information includes configuration information of the independent carrier, where, method 1: the configuration information of the independent carrier includes configuration information of an adjacent extended carrier of the independent carrier and/or configuration information of a non-adjacent extended carrier of the independent carrier, or method 2: the configuration information of the independent carrier indicates an adjacent extended carrier of the independent carrier and/or a non-adjacent extended carrier of the independent carrier, where the configuration information of the adjacent extended carrier is configured in an information element IE (Information Element, information element) defined for an adjacent extended carrier, and the configuration information of the non-adjacent extended carrier is configured in an information element IE defined for a non-adjacent extended carrier. The base station may be an evolved base station.

Further, the base station needs to further configure the independent carrier, that is, the base station needs to further configure an independent carrier to which the extended carrier is attached, which includes the following methods:

First method: If the configuration information of the independent carrier indicates an extended carrier (including an adjacent extended carrier and/or a non-adjacent extended carrier), the independent carrier to which the extended carrier is attached is configured to the independent carrier indicating the extended carrier, which means an attachment relationship exists between the extended carrier and the independent carrier indicating the extended carrier.

Second method: The independent carrier is configured to a primary carrier by default, which means the non-adjacent extended carrier is attached to the primary carrier.

Third method: The independent carrier is configured to an activated carrier whose central frequency is closest to the non-adjacent extended carrier, which means the non-adjacent extended carrier is attached to the activated carrier (including a primary carrier and a secondary carrier) whose central frequency is closest to the non-adjacent extended carrier.

Fourth method: A new MAC CE is extended to indicate the independent carrier, that is, to indicate an independent carrier to which the activated non-adjacent extended carrier is attached.

102. The base station activates or deactivates the extended carrier by using a bit in an original MAC CE and/or an extended MAC CE and corresponding to an index of the extended carrier. The original MAC CE is used to indicate activation or deactivation of the independent carrier. The extended MAC CE is a new MAC CE added on the basis of the existing MAC CE.

Step 102 has different implementation methods according to whether the extended carrier has an independent index. Whether the extended carrier has an independent index includes the following cases: 1) the adjacent extended carrier uses the same index as the independent carrier to which the adjacent extended carrier is attached, and the non-adjacent extended carrier uses an independent index; 2) no extended carrier (including the adjacent extended carrier and the non-adjacent extended carrier) has an independent index; for example, the extended carrier uses the same index as the independent carrier to which the extended carrier is attached; and 3) the extended carrier (including the non-adjacent extended carrier and the adjacent extended carrier) has an independent index. With respect to the first case, five activation or deactivation solutions are provided in this embodiment; with respect to the second case, two activation or deactivation solutions are provided in this embodiment; and with respect to the third case, two activation or deactivation solutions are provided in this embodiment. The following describes corresponding activation or deactivation solutions with respect to each of the foregoing cases of whether the extended carrier has an independent index.

With respect to the first case where the adjacent extended carrier uses the same index as the independent carrier to which the adjacent extended carrier is attached and the non-adjacent extended carrier uses an independent index, step 102 includes at least the following five implementation methods:

First method: The non-adjacent extended carrier is activated or deactivated by using a bit in the original MAC CE and/or an extended MAC CE of the non-adjacent extended carrier and corresponding to an index of the non-adjacent extended carrier, a reserved bit in the original MAC CE is used to indicate whether there is an instruction to activate the adjacent extended carrier, and the adjacent extended carrier is activated or deactivated by using a bit in an extended MAC CE of the adjacent extended carrier and corresponding to an index of the independent carrier to which the adjacent extended carrier is attached.

That the non-adjacent extended carrier is activated or deactivated by using a bit in the original MAC CE and/or an extended MAC CE of the non-adjacent extended carrier and corresponding to an index of the non-adjacent extended carrier is specifically as follows: if a sum of the number of non-adjacent extended carriers and the number of configured independent carriers is greater than 8 (that is, the number of bits of one byte), a non-adjacent extended carrier needs to be activated or deactivated by using an extended MAC CE of the non-adjacent extended carrier, or a non-adjacent extended carrier may be activated or deactivated by using both the original MAC CE and an extended MAC CE of the non-adjacent extended carrier; and if the sum of the number of non-adjacent extended carriers and the number of configured independent carriers is equal to or smaller than 8, the non-adjacent extended carrier is activated or deactivated by using the original MAC CE.

By using this method, a non-adjacent extended carrier can be activated or deactivated independently, while multiple adjacent extended carriers of one independent carrier can only be activated or deactivated concurrently.

Further, the independent carrier may be activated by using a method in the prior art. That is, the independent carrier is activated or deactivated by using a bit in the original MAC CE and corresponding to the index of the independent carrier. For details, reference may be made to the description of the background of the present invention, which is not described again herein.

Because the non-adjacent extended carrier has an independent index relative to the independent carrier, the non-adjacent extended carrier and the independent carrier may be both activated or deactivated by using the original MAC CE, but they use different bits in the original MAC CE.

It should be noted that an MAC CE in the prior art (that is, the original MAC CE) has one byte only and includes a reserved bit R. In R10, at most five carriers are aggregated, and the primary carrier does not need an activation instruction. Therefore, at most four secondary carriers need an activation instruction. In this case, at least three bits in the original MAC CE are idle.

Figure 4:
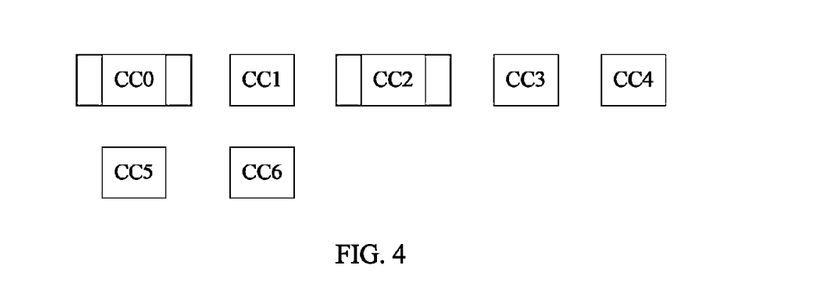
FIG. 4 is a schematic diagram of an extended carrier according to Embodiment 1 of the present invention.

The following describes the first method by using an example. Referring to FIG. 4, a base station configures five independent CCs (Component Carrier, component carrier) for a user equipment, and indexes of the five independent CCs are 0, 1, 2, 3, and 4 respectively, where CC0 refers to a primary carrier. In addition, the base station configures two non-adjacent extended carriers, and indexes of the two non-adjacent extended carriers are 5 and 6. Furthermore, the base station configures four adjacent extended carriers, where the four adjacent extended carriers include two adjacent extended carriers (marked in gray color) adjacent to CC0 and two adjacent extended carriers (marked in gray color) adjacent to CC2.

Figure 5:
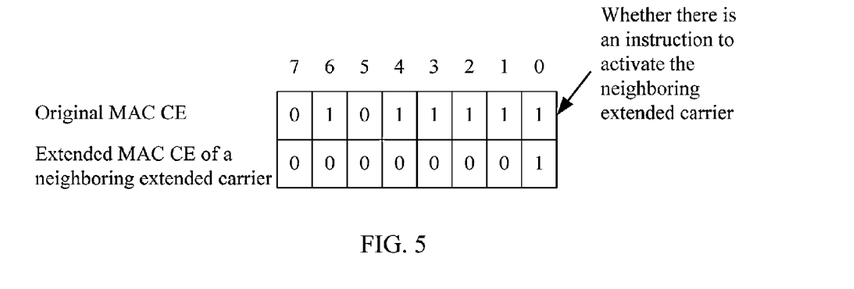
FIG. 5 is a schematic diagram of an instruction to activate or deactivate an extended carrier according to Embodiment 1 of the present invention.

Referring to FIG. 5, bits 1 to 4 corresponding to indexes of independent carriers CC1 to CC4 in the original MAC CE are set to 1, indicating that the independent carriers CC1 to CC4 are instructed to be activated; bit 5 in the original MAC CE and corresponding to an index of a non-adjacent extended carrier CC5 is set to 0, indicating that the non-adjacent extended carrier CC5 is instructed to be deactivated; and bit 6 in the original MAC CE and corresponding to an index of a non-adjacent extended carrier CC6 is set to 1, indicating that the non-adjacent extended carrier CC6 is instructed to be activated. Reserved bit 0 in the original MAC CE is set to 1, indicating that another adjacent extended carrier is instructed to be activated; bit 0 in an extended MAC CE and corresponding to an index of an independent carrier to which the adjacent extended carrier is attached is set to 1, indicating that the two adjacent extended carriers adjacent to CC0 are instructed to be activated; and bit 2 in the extended MAC CE and corresponding to indexes of the adjacent extended carriers is set to 0, indicating that the two adjacent extended carriers adjacent to CC2 are instructed to be deactivated.

Second method: The non-adjacent extended carrier is activated or activated by using a bit in the original MAC CE and/or an extended MAC CE of the non-adjacent extended carrier and corresponding to an index of the non-adjacent extended carrier; a reserved bit in the original MAC CE is used to indicate whether there is an instruction to activate the adjacent extended carrier; a first adjacent extended carrier of the independent carrier is activated or deactivated by using a bit in a first extended MAC CE and corresponding to an index of the first adjacent extended carrier of the independent carrier; and a second adjacent extended carrier of the independent carrier is activated or deactivated by using a bit in a second extended MAC CE and corresponding to an index of the second adjacent extended carrier of the independent carrier, where the first adjacent extended carrier and the second adjacent extended carrier are set according to a configuration sequence or a frequency sequence in descending order.

That "the non-adjacent extended carrier is activated or deactivated by using a bit in the original MAC CE and/or an extended MAC CE of the non-adjacent extended carrier and corresponding to an index of the non-adjacent extended carrier" in the second method is the same as the specific implementation method in the first method, which is not described again herein.

By using this method, all extended carriers can be activated or deactivated independently. That is, a non-adjacent extended carrier can be activated or deactivated independently, and multiple adjacent extended carriers of one independent carrier can also be activated or deactivated independently one by one.

It should be noted that one independent carrier has two adjacent extended carriers at most. Therefore, at most two indication bytes MAC CE with respect to activation or deactivation of an adjacent extended carrier need to be extended.

Figure 6:
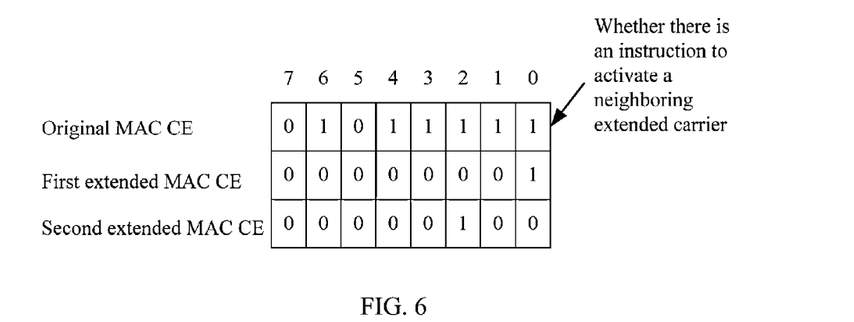
FIG. 6 is another schematic diagram of an instruction to activate or deactivate an extended carrier according to Embodiment 1 of the present invention.

The following describes the second method by using an example. Referring to FIG. 4 and FIG. 6, for the meaning of each byte in the original MAC CE, refer to FIG. 5, which is not described again herein. Bit 0 in the first extended MAC CE is set to 1, indicating that the first adjacent extended carrier of CC0 is instructed to be activated, and bit 0 in the second extended MAC CE is set to 0, indicating that the second adjacent extended carrier of CC0 is instructed to be deactivated. Bit 2 in the first extended MAC CE is set to 0, indicating that the first adjacent extended carrier of CC2 is instructed to be deactivated, and bit 2 in the second extended MAC CE is set to 1, indicating that the second adjacent extended carrier of CC2 is instructed to be activated.

Third method: A reserved bit in the original MAC CE is used to indicate whether there is an instruction to activate an extended carrier; and one MAC CE is extended, according to a configuration sequence or a frequency sequence in descending order, for an independent carrier configured with an extended carrier, where each independent carrier indicates, in a corresponding extended MAC CE of each independent carrier and according to a sequence of multiple extended carriers configured for the independent carrier, activation or deactivation of the multiple extended carriers in turn.

By using this method, all extended carriers can be activated or deactivated independently. That is, a non-adjacent extended carrier can be activated or deactivated independently, and multiple adjacent extended carriers of one independent carrier can also be activated or deactivated independently one by one.

Figure 7:
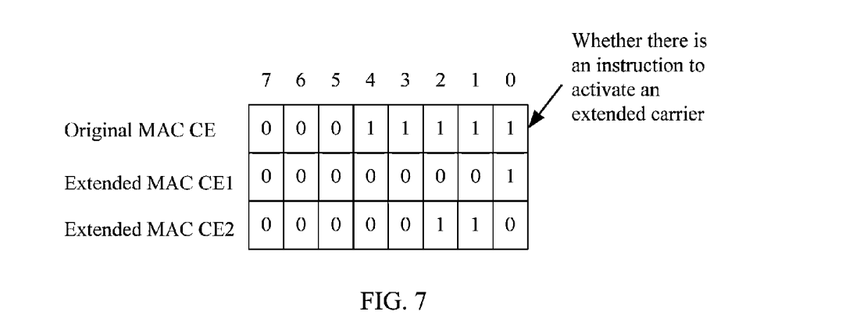
FIG. 7 is another schematic diagram of an instruction to activate or deactivate an extended carrier according to Embodiment 1 of the present invention.

The following describes the third method by using an example. Referring to FIG. 4 and FIG. 7, it is assumed that CC5 is attached to CC0 and CC6 is attached to CC2, which means only two independent carriers CC0 and CC2 are configured with extended carriers. These two independent carriers may be extended separately. Extended MAC CE1 corresponds to an instruction to activate or deactivate the extended carriers of CC0, and extended MAC CE2 corresponds to an instruction to activate or deactivate the extended carriers of CC2. Specifically, CC0 has three extended carriers, where bit 0 in extended MAC CE1 indicates 1, which means that a first extended carrier of CC0 is activated; bit 1 in extended MAC CE1 indicates 0, which means that a second extended carrier of CC0 is deactivated; and bit 2 in extended MAC CE1 indicates 0, which means that a third extended carrier of CC0 is deactivated. CC2 also has three extended carriers, where bit 0 in extended MAC CE2 indicates 0, which means that a first extended carrier of CC2 is deactivated; bit 1 in extended MAC CE2 is indicates 1, which means that a second extended carrier of CC2 is activated; and bit 2 in extended MAC CE2 indicates 1, which means that a third extended carrier of CC2 is activated.

Fourth method: The non-adjacent extended carrier is activated or deactivated by using a bit in the original MAC CE or/and an extended MAC CE of the non-adjacent extended carrier and corresponding to an index of the non-adjacent extended carrier; a reserved bit in the original MAC CE is used to indicate whether there is an instruction to activate the adjacent extended carrier; and one MAC CE is extended, according to a configuration sequence or a frequency sequence in descending order, for an independent carrier configured with an adjacent extended carrier, where each independent carrier indicates, in a corresponding extended MAC CE of each independent carrier and according to a sequence of multiple adjacent extended carriers configured for the independent carrier, activation or deactivation of the multiple adjacent extended carriers in turn.

That "the non-adjacent extended carrier is activated or deactivated by using a bit in the original MAC CE or/and an extended MAC CE of the non-adjacent extended carrier and corresponding to an index of the non-adjacent extended carrier" in the fourth method is the same as the specific implementation method in the first method, which is not described again herein.

By using this method, all extended carriers can be activated or deactivated independently. That is, a non-adjacent extended carrier can be activated or deactivated independently, and multiple adjacent extended carriers of one independent carrier can also be activated or deactivated independently one by one.

Figure 8:
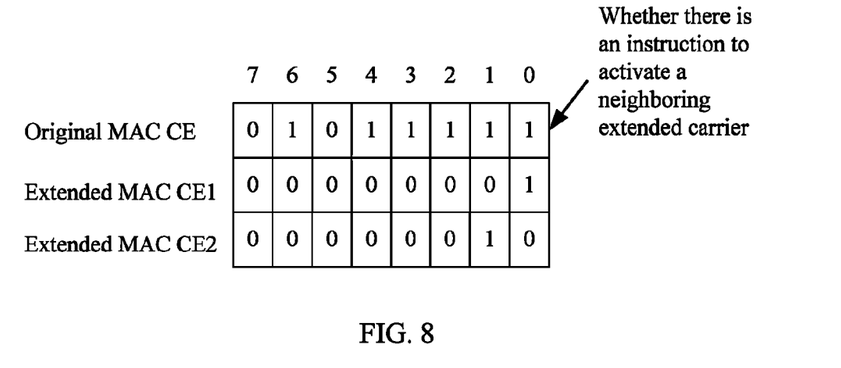
FIG. 8 is another schematic diagram of an instruction to activate or deactivate an extended carrier according to Embodiment 1 of the present invention.

The following describes the fourth method by using an example. Referring to FIG. 4 and FIG. 8, only two independent carriers CC0 and CC2 are configured with extended carriers, and these two independent carriers are extended separately. Extended MAC CE1 corresponds to an instruction to activate or deactivate an adjacent extended carrier of CC0, and extended MAC CE2 corresponds to an instruction to activate or deactivate an adjacent extended carrier of CC2. CC0 has two adjacent extended carriers, where bit 0 in extended MAC CE1 indicates 1, which means that a first adjacent extended carrier of CC0 is activated; and bit 1 in extended MAC CE1 indicates 0, which means that a second adjacent extended carrier of CC0 is deactivated. CC2 also has two adjacent extended carriers, where bit 0 in extended MAC CE2 indicates 0, which means that a first extended carrier of CC2 is deactivated; and bit 1 in extended MAC CE2 indicates 1, which means that a second extended carrier of CC2 is activated.

Fifth method: The independent carrier is activated or deactivated by using a bit in the original MAC CE and corresponding to an index of the independent carrier, where a non-adjacent extended carrier is activated or deactivated concurrently with the independent carrier to which the non-adjacent extended carrier is attached. That is, a bit corresponding to the index of the independent carrier is used to activate or deactivate the independent carrier, and is also used to activate or deactivate the non-adjacent extended carrier. There are two processing methods with respect to an adjacent extended carrier: one is to activate or deactivate the adjacent extended carrier concurrently with an independent carrier to which the adjacent extended carrier is attached, where the adjacent extended carrier and the independent carrier to which the adjacent extended carrier is attached are both activated or deactivated by using a bit in the original MAC CE; and the other is to use a reserved bit in the original MAC CE to indicate whether there is an instruction to activate the adjacent extended carrier, and use a bit in an extended MAC CE of the adjacent extended carrier and corresponding to the index of the independent carrier to which the adjacent extended carrier is attached to activate or deactivate the adjacent extended carrier.

With respect to the second case where no extended carrier (including the adjacent extended carrier and the non-adjacent extended carrier) has an independent index, for example, the extended carrier uses the same index as the independent carrier to which the extended carrier is attached, step 102 includes at least the following two implementation methods:

First method: The base station activates or deactivates the independent carrier by using a bit in the original MAC CE and corresponding to an index of the independent carrier, where the extended carrier is activated or deactivated concurrently with the independent carrier to which the extended carrier is attached.

By using this method, an extended carrier is set to be activated or deactivated concurrently with an independent carrier to which the extended carrier is attached. The extended carrier can be activated or deactivated concurrently by using an original MAC CE only, which provides good compatibility.

Second method: A reserved bit in the original MAC CE is used to indicate whether there is an instruction to activate the extended carrier; and one MAC CE is extended, according to a configuration sequence or a frequency sequence in descending order, for an independent carrier configured with an extended carrier, where each independent carrier indicates, in a corresponding extended MAC CE of each independent carrier and according to a sequence of multiple extended carriers configured for the independent carrier, activation or deactivation of the multiple extended carriers in turn.

With respect to the third case where the extended carrier (including the non-adjacent extended carrier and the adjacent extended carrier) has an independent index, step 102 includes at least the following two implementation methods:

First method: A reserved bit in the original MAC CE is used to indicate whether there is an instruction to activate the extended carrier; and one MAC CE is extended, according to a configuration sequence or a frequency sequence in descending order, for an independent carrier configured with an extended carrier, where each independent carrier indicates, in a corresponding extended MAC CE of each independent carrier and according to a sequence of multiple extended carriers configured for the independent carrier, activation or deactivation of the multiple extended carriers in turn.

In this method, all extended carriers have independent indexes. Therefore, the extended carriers can be activated or deactivated independently.

Second method: When a sum of the number of extended carriers and the number of independent carriers is smaller than or equal to 8, the extended carrier is activated or deactivated by using a bit in the original MAC CE and corresponding to an index of the extended carrier; when the sum of the number of extended carriers and the number of independent carriers is greater than 8, the extended carrier is activated or deactivated by using a bit in the extended MAC CE and corresponding to the index of the extended carrier, or the extended carrier is activated or deactivated by using a bit in the original MAC CE and the extended MAC CE and corresponding to the index of the extended carrier; and a reserved bit R in the original MAC CE may be reserved or be used to indicate whether there is an instruction to activate the extended carrier.

In this method, all extended carriers have independent indexes. Therefore, the extended carriers can be activated or deactivated independently.

Figure 9:
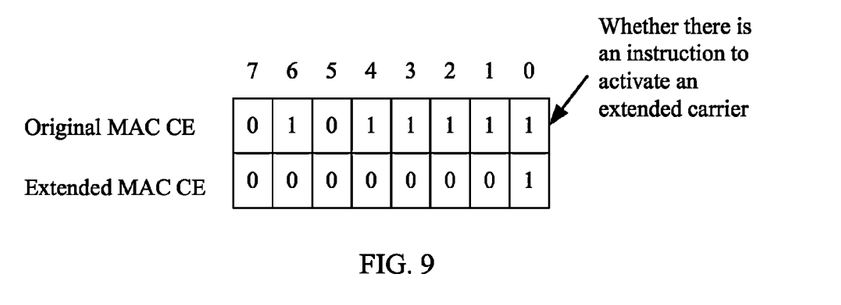
FIG. 9 is another schematic diagram of an instruction to activate or deactivate an extended carrier according to Embodiment 1 of the present invention.

The following describes the second method provided in this embodiment by using an example. Referring to FIG. 4 and FIG. 9, if a sum of the number of extended carriers and the number of independent carriers is smaller than or equal to 8, idle bits 5, 6, and 7 in the original MAC CE are used directly to indicate activation or deactivation. If the sum of the number of extended carriers and the number of configured independent carriers is greater than 8, one or more MAC CE bytes need to be extended. In this case, idle bits in the original MAC CE may still be used preferentially.

In this embodiment, by configuring an extended carrier for a user equipment, and activating or deactivating the extended carrier by using a bit in an original MAC CE and/or an extended MAC CE and corresponding to an index of the extended carrier, a solution for activating or deactivating an extended carrier is provided.

Embodiment 2

Figure 10:
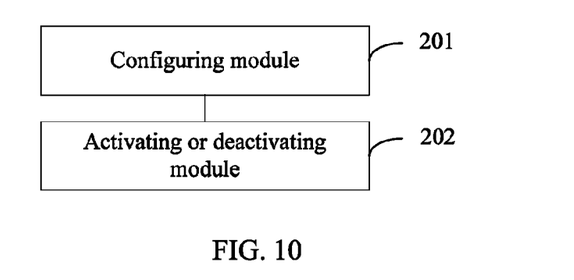
FIG. 10 is a schematic structural diagram of a base station according to Embodiment 2 of the present invention.

Referring to FIG. 10, this embodiment provides a base station, where the base station includes:

a configuring module 201, which may be a configuration processor and is adapted to configure an extended carrier of an independent carrier for a user equipment, where the extended carrier includes at least one of an adjacent extended carrier of the independent carrier and a non-adjacent extended carrier of the independent carrier; and an activating or deactivating module 202, which may be another processor and is adapted to activate or deactivate the extended carrier by using a bit in an original media access control control element MAC CE and/or an extended MAC CE and corresponding to an index of the extended carrier.

Figure 11:
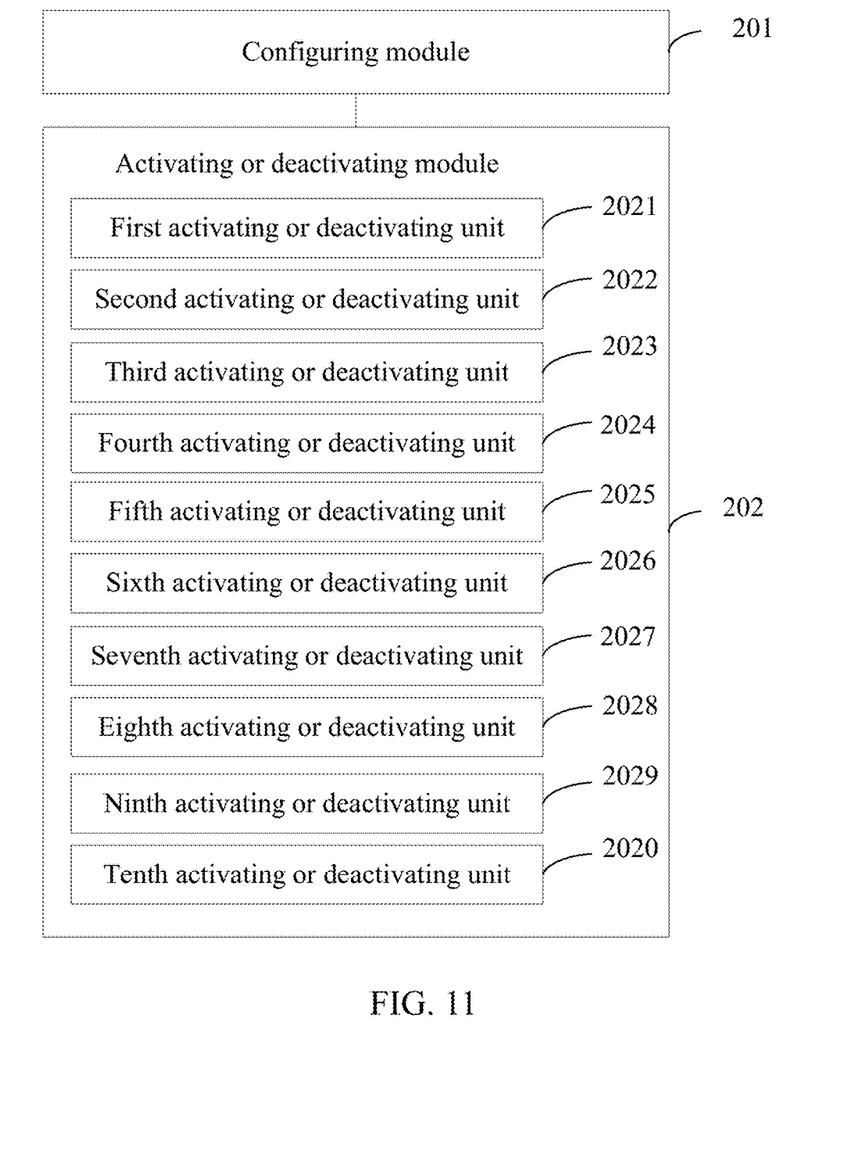
FIG. 11 is another schematic structural diagram of a base station according to Embodiment 2 of the present invention.

Referring to FIG. 11, the non-adjacent extended carrier has an independent index and the adjacent extended carrier uses the same index as the independent carrier. That is, the non-adjacent extended carrier has an independent index, and the adjacent extended carrier use the same index as the independent carrier to which the adjacent extended carrier is attached.

The activating or deactivating module 202 includes a first activating or deactivating unit 2021, a second activating or deactivating unit 2022, a third activating or deactivating unit 2023, a fourth activating or deactivating unit 2024, a fifth activating or deactivating unit 2025, or a sixth activating or deactivating unit 2026. Each of the units may be an independent processor or part of functions of a processor.

The first activating or deactivating unit 2021 is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, and activate or deactivate the adjacent extended carrier by using a bit in an extended MAC CE of the adjacent extended carrier and corresponding to an index of the independent carrier.

The second activating or deactivating unit 2022 is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, activate or deactivate a first adjacent extended carrier of the independent carrier by using a bit in a first extended MAC CE and corresponding to an index of the first adjacent extended carrier of the independent carrier, and activate or deactivate a second adjacent extended carrier of the independent carrier by using a bit in a second extended MAC CE and corresponding to an index of the second adjacent extended carrier of the independent carrier, where the first adjacent extended carrier and the second adjacent extended carrier are set according to a configuration sequence or a frequency sequence in descending order.

The third activating or deactivating unit 2023 is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn.

The fourth activating or deactivating unit 2024 is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, and indicate, in an extended MAC CE of the independent carrier and according to a sequence of multiple adjacent extended carriers of the independent carrier, activation or deactivation of the multiple adjacent extended carriers in turn.

The fifth activating or deactivating unit 2025 is adapted to activate or deactivate the independent carrier by using a bit in the original MAC CE and corresponding to an index of the independent carrier, where the non-adjacent extended carrier is activated or deactivated concurrently with the independent carrier, and the adjacent extended carrier is activated or deactivated concurrently with the independent carrier.

The sixth activating or deactivating unit 2026 is adapted to activate or deactivate the independent carrier by using a bit in the original MAC CE and corresponding to an index of the independent carrier, where the non-adjacent extended carrier is activated or deactivated concurrently with the independent carrier, use a reserved bit in the original MAC CE to indicate whether there is an instruction to activate the adjacent extended carrier, and activate or deactivate the adjacent extended carrier by using a bit in an extended MAC CE of the adjacent extended carrier and corresponding to an index of the independent carrier.

The extended carrier uses the same index as the independent carrier. That is, the extended carrier uses the same index as the independent carrier to which the extended carrier is attached. The activating or deactivating module 202 includes a seventh activating or deactivating unit 2027 or an eighth activating or deactivating unit 2028, where each of the units may be an independent processor or part of functions of a processor.

The seventh activating or deactivating unit 2027 is adapted to activate or deactivate the independent carrier by using a bit in the original MAC CE and corresponding to an index of the independent carrier, where the extended carrier is activated or deactivated concurrently with the independent carrier.

The eighth activating or deactivating unit 2028 is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn.

When the non-adjacent extended carrier and the adjacent extended carrier both have independent indexes, the activating or deactivating module 202 includes: a ninth activating or deactivating unit 2029 or a tenth activating or deactivating unit 2020, where each of the units may be an independent processor or part of functions of a processor.

The ninth activating or deactivating unit 2029 is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn.

The tenth activating or deactivating unit 2020 is adapted to, when a sum of the number of extended carriers and the number of independent carriers is smaller than or equal to 8, activate or deactivate the extended carrier by using a bit in the original MAC CE and corresponding to an index of the extended carrier; and, when the sum of the number of extended carriers and the number of independent carriers is greater than 8, activate or deactivate the extended carrier by using a bit in the extended MAC CE and corresponding to the index of the extended carrier, or activate or deactivate the extended carrier by using a bit in the original MAC CE and the extended MAC CE and corresponding to the index of the extended carrier.

The configuring module 201 is adapted to send carrier configuration information to the user equipment, where the carrier configuration information includes configuration information of the independent carrier, where the configuration information of the independent carrier includes configuration information of the adjacent extended carrier of the independent carrier and/or configuration information of the non-adjacent extended carrier of the independent carrier, or the configuration information of the independent carrier indicates that the independent carrier has an adjacent extended carrier and/or a non-adjacent extended carrier; configure the configuration information of the adjacent extended carrier in an information element IE defined for the adjacent extended carrier; and configure the configuration information of the non-adjacent extended carrier in an information element IE defined for the non-adjacent extended carrier.

The configuring module 201 is further adapted to configure the independent carrier, including:

if the configuration information of the independent carrier indicates an extended carrier, configuring the independent carrier to an independent carrier indicating the extended carrier;

or, configuring the independent carrier to a primary carrier or an activated carrier whose central frequency is closest to the non-adjacent extended carrier;

or, using a new extended MAC CE to indicate the activated independent carrier.

The base station provided in this embodiment and the base station in the method embodiment are based on the same idea. For the specific implementation, refer to the method embodiment, which is not described again herein.

With the base station provided in this embodiment, by configuring an extended carrier for a user equipment, and activating or deactivating the extended carrier by using a bit in an original MAC CE and/or an extended MAC CE and corresponding to an index of the extended carrier, a solution for activating or deactivating an extended carrier is provided.

All or part of contents of the technical solution provided in the foregoing embodiments can be implemented through software programming. The software program is stored in a readable storage medium, such as a hard disk, a compact disk or a floppy disk of a computer.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

What is claimed is:

1. A method for activating or deactivating an extended carrier, comprising:
   configuring an extended carrier of an independent carrier for a user equipment, wherein the extended carrier comprises at least one of an adjacent extended carrier of the independent carrier and a non-adjacent extended carrier of the independent carrier; and
   activating or deactivating the extended carrier by using a bit in an original media access control control element (MAC CE) and/or an extended MAC CE and corresponding to an index of the extended carrier.

2. The method according to claim 1, wherein the non-adjacent extended carrier has an independent index and the adjacent extended carrier uses the same index as the independent carrier; and
   the activating or deactivating the extended carrier by using a bit in an original MAC CE and/or an extended MAC CE and corresponding to an index of the extended carrier comprises:
   activating or deactivating the non-adjacent extended carrier by using a bit in the original MAC CE and/or an extended MAC CE of the non-adjacent extended carrier and corresponding to an index of the non-adjacent extended carrier, using a reserved bit in the original MAC CE to indicate whether there is an instruction to activate the adjacent extended carrier, and activating or deactivating the adjacent extended carrier by using a bit in an extended MAC CE of the adjacent extended carrier and corresponding to an index of the independent carrier;
   or, activating or deactivating the non-adjacent extended carrier by using a bit in the original MAC CE and/or an extended MAC CE of the non-adjacent extended carrier and corresponding to an index of the non-adjacent extended carrier, using a reserved bit in the original MAC CE to indicate whether there is an instruction to activate the adjacent extended carrier, activating or deactivating a first adjacent extended carrier of the independent carrier by using a bit in a first extended MAC CE and corresponding to an index of the first adjacent extended carrier of the independent carrier, and activating or deactivating a second adjacent extended carrier of the independent carrier by using a bit in a second extended MAC CE and corresponding to an index of the second adjacent extended carrier of the independent carrier, wherein the first adjacent extended carrier and the second adjacent extended carrier are set according to a configuration sequence or a frequency sequence in descending order;
   or, using a reserved bit in the original MAC CE to indicate whether there is an instruction to activate the extended carrier, and indicating, in an extended MAC CE of the independent carrier and according to a sequence of multiple extended carriers of the independent carrier, activation or deactivation of the multiple extended carriers in turn;
   or, activating or deactivating the non-adjacent extended carrier by using a bit in the original MAC CE and/or an extended MAC CE of the non-adjacent extended carrier and corresponding to an index of the non-adjacent extended carrier, using a reserved bit in the original MAC CE to indicate whether there is an instruction to activate the adjacent extended carrier, and indicating, in an extended MAC CE of the independent carrier and according to a sequence of multiple extended carriers of the independent carrier, activation or deactivation of the multiple extended carriers in turn;

or, activating or deactivating the independent carrier by using a bit in the original MAC CE and corresponding to an index of the independent carrier, wherein the non-adjacent extended carrier is activated or deactivated concurrently with the independent carrier and the adjacent extended carrier is activated or deactivated concurrently with the independent carrier;

or, activating or deactivating the independent carrier by using a bit in the original MAC CE and corresponding to an index of the independent carrier, wherein the non-adjacent extended carrier is activated or deactivated concurrently with the independent carrier, using a reserved bit in the original MAC CE to indicate whether there is an instruction to activate the adjacent extended carrier, and activating or deactivating the adjacent extended carrier by using a bit in an extended MAC CE of the adjacent extended carrier and corresponding to an index of the independent carrier.

3. The method according to claim 1, wherein the extended carrier uses the same index as the independent carrier; and
the activating or deactivating the extended carrier by using a bit in an original MAC CE and/or an extended MAC CE and corresponding to an index of the extended carrier comprises:
activating or deactivating the independent carrier by using a bit in the original MAC CE and corresponding to an index of the independent carrier, wherein the extended carrier is activated or deactivated concurrently with the independent carrier;
or, using a reserved bit in the original MAC CE to indicate whether there is an instruction to activate the extended carrier, and indicating, in an extended MAC CE of the independent carrier and according to a sequence of multiple extended carriers of the independent carrier, activation or deactivation of the multiple extended carriers in turn.

4. The method according to claim 1, wherein the non-adjacent extended carrier and the adjacent extended carrier both have independent indexes; and
the activating or deactivating the extended carrier by using a bit in an original MAC CE and/or an extended MAC CE and corresponding to an index of the extended carrier comprises:
using a reserved bit in the original MAC CE to indicate whether there is an instruction to activate the extended carrier, and indicating, in an extended MAC CE of the independent carrier and according to a sequence of multiple extended carriers of the independent carrier, activation or deactivation of the multiple extended carriers in turn;
or, when a sum of the number of extended carriers and the number of independent carriers is smaller than or equal to 8, activating or deactivating the extended carrier by using a bit in the original MAC CE and corresponding to an index of the extended carrier; and, when the sum of the number of extended carriers and the number of independent carriers is greater than 8, activating or deactivating the extended carrier by using a bit in the extended MAC CE and corresponding to the index of the extended carrier, or activating or deactivating the extended carrier by using a bit in the original MAC CE and the extended MAC CE and corresponding to the index of the extended carrier.

5. The method according to claim 1, wherein the configuring an extended carrier of an independent carrier for a user equipment, wherein the extended carrier comprises at least one of an adjacent extended carrier of the independent carrier and a non-adjacent extended carrier of the independent carrier, comprises:
sending carrier configuration information to the user equipment, wherein the carrier configuration information comprises configuration information of the independent carrier, wherein the configuration information of the independent carrier comprises configuration information of the adjacent extended carrier of the independent carrier and/or configuration information of the non-adjacent extended carrier of the independent carrier, or the configuration information of the independent carrier indicates that the independent carrier has an adjacent extended carrier and/or a non-adjacent extended carrier; configuring the configuration information of the adjacent extended carrier in an information element (IE) defined for the adjacent extended carrier; and configuring the configuration information of the non-adjacent extended carrier in an information element (IE) defined for the non-adjacent extended carrier.

6. The method according to claim 1, further comprising configuring the independent carrier, comprising:
if the configuration information of the independent carrier indicates an extended carrier, configuring the independent carrier to an independent carrier indicating the extended carrier;
or, configuring the independent carrier to a primary carrier or an activated carrier whose central frequency is closest to the non-adjacent extended carrier;
or, using a new extended MAC CE to indicate the activated independent carrier.

7. A base station, comprising:
a configuring module, adapted to configure an extended carrier of an independent carrier for a user equipment, wherein the extended carrier comprises at least one of an adjacent extended carrier of the independent carrier and a non-adjacent extended carrier of the independent carrier; and
an activating or deactivating module, adapted to activate or deactivate the extended carrier by using a bit in an original media access control control element (MAC CE) and/or an extended MAC CE and corresponding to an index of the extended carrier.

8. The base station according to claim 7, wherein the non-adjacent extended carrier has an independent index and the adjacent extended carrier uses the same index as the independent carrier; and
the activating or deactivating module comprises: a first activating or deactivating unit, a second activating or deactivating unit, a third activating or deactivating unit, a fourth activating or deactivating unit, a fifth activating or deactivating unit, or a sixth activating or deactivating unit, wherein:
the first activating or deactivating unit is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, and activate or deactivate the adjacent extended carrier by using a bit in an extended MAC CE of the adjacent extended carrier and corresponding to an index of the independent carrier;

the second activating or deactivating unit is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, activate or deactivate a first adjacent extended carrier of the independent carrier by using a bit in a first extended MAC CE and corresponding to an index of the first adjacent extended carrier of the independent carrier, and activate or deactivate a second adjacent extended carrier of the independent carrier by using a bit in a second extended MAC CE and corresponding to an index of the second adjacent extended carrier of the independent carrier, wherein the first adjacent extended carrier and the second adjacent extended carrier are set according to a configuration sequence or a frequency sequence in descending order;

the third activating or deactivating unit is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn;

the fourth activating or deactivating unit is adapted to activate or deactivate the non-adjacent extended carrier by using a bit in the original MAC CE and/or an extended MAC CE of the non-adjacent extended carrier and corresponding to an index of the non-adjacent extended carrier, use a reserved bit in the original MAC CE to indicate whether there is an instruction to activate the adjacent extended carrier, and indicate, in an extended MAC CE of the independent carrier and according to a sequence of multiple adjacent extended carriers of the independent carrier, activation or deactivation of the multiple adjacent extended carriers in turn;

the fifth activating or deactivating unit is adapted to activate or deactivate the independent carrier by using a bit in the original MAC CE and corresponding to an index of the independent carrier, wherein the non-adjacent extended carrier is activated or deactivated concurrently with the independent carrier and the adjacent extended carrier is activated or deactivated concurrently with the independent carrier; and the sixth activating or deactivating unit is adapted to activate or deactivate the independent carrier by using a bit in the original MAC CE and corresponding to an index of the independent carrier, wherein the non-adjacent extended carrier is activated or deactivated concurrently with the independent carrier, use a reserved bit in the original MAC CE to indicate whether there is an instruction to activate the adjacent extended carrier, and activate or deactivate the adjacent extended carrier by using a bit in an extended MAC CE of the adjacent extended carrier and corresponding to an index of the independent carrier.

9. The base station according to claim 7, wherein the extended carrier uses the same index as the independent carrier; and the activating or deactivating module comprises a seventh activating or deactivating unit or an eighth activating or deactivating unit, wherein:

the seventh activating or deactivating unit is adapted to activate or deactivate the independent carrier by using a bit in the original MAC CE and corresponding to an index of the independent carrier, wherein the extended carrier is activated or deactivated concurrently with the independent carrier; and the eighth activating or deactivating unit is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn.

10. The base station according to claim 7, wherein the non-adjacent extended carrier and the adjacent extended carrier both have independent indexes; and the activating or deactivating module comprises a ninth activating or deactivating unit or a tenth activating or deactivating unit, wherein:

the ninth activating or deactivating unit is adapted to use a reserved bit in the original MAC CE to indicate whether there is an instruction to activate the extended carrier, and indicate, in an extended MAC CE of the independent carrier and according to a sequence of multiple extended carriers of the independent carrier, activation or deactivation of the multiple extended carriers in turn; and the tenth activating or deactivating unit is adapted to, when a sum of the number of extended carriers and the number of independent carriers is smaller than or equal to 8, activate or deactivate the extended carrier by using a bit in the original MAC CE and corresponding to an index of the extended carrier; and, when the sum of the number of extended carriers and the number of independent carriers is greater than 8, activate or deactivate the extended carrier by using a bit in the extended MAC CE and corresponding to the index of the extended carrier, or activate or deactivate the extended carrier by using a bit in the original MAC CE and the extended MAC CE and corresponding to the index of the extended carrier.

11. The base station according to claim 7, wherein the configuring module is adapted to:

send carrier configuration information to the user equipment, wherein the carrier configuration information comprises configuration information of the independent carrier, wherein the configuration information of the independent carrier comprises configuration information of the adjacent extended carrier of the independent carrier and/or configuration information of the non-adjacent extended carrier of the independent carrier, or the configuration information of the independent carrier indicates that the independent carrier has an adjacent extended carrier and/or a non-adjacent extended carrier; configure the configuration information of the adjacent extended carrier in an information element (IE) defined for the adjacent extended carrier; and configure the configuration information of the non-adjacent extended carrier in an information element (IE) defined for the non-adjacent extended carrier.

12. The base station according to claim 7, wherein the configuring module is further adapted to configure the independent carrier, comprising:

if the configuration information of the independent carrier indicates an extended carrier, configuring the independent carrier to an independent carrier indicating the extended carrier;

or, configuring the independent carrier to a primary carrier or an activated carrier whose central frequency is closest to the non-adjacent extended carrier;

or, using a new extended MAC CE to indicate the activated independent carrier.

* * * * *